(12) United States Patent
Thirukk valur

(10) Patent No.: US 7,527,888 B2
(45) Date of Patent: May 5, 2009

(54) CURRENT COLLECTOR SUPPORTED FUEL CELL

(75) Inventor: Niranjan Thirukk valur, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 679 days.

(21) Appl. No.: 10/648,096

(22) Filed: Aug. 26, 2003

(65) Prior Publication Data
US 2005/0048343 A1  Mar. 3, 2005

(51) Int. Cl.
H01M 2/00 (2006.01)
(52) U.S. Cl. .......................................... 429/34; 429/30
(58) Field of Classification Search ........................ None
See application file for complete search history.

(56) References Cited

U.S. PATENT DOCUMENTS

| | | | |
|---|---|---|---|
| 3,645,894 A | 2/1972 | Krystyniak | |
| 5,273,837 A * | 12/1993 | Aitken et al. | 429/30 |
| 5,458,989 A | 10/1995 | Dodge | |
| 5,753,385 A | 5/1998 | Jankowski et al. | |
| 6,051,331 A | 4/2000 | Spear, Jr. et al. | |
| 6,638,654 B2 * | 10/2003 | Jankowksi et al. | 429/26 |
| 6,972,161 B2 * | 12/2005 | Beatty et al. | 429/38 |
| 2002/0060148 A1 | 5/2002 | Shelin et al. | |
| 2002/0177026 A1 * | 11/2002 | Hatano et al. | 429/32 |
| 2004/0033403 A1 * | 2/2004 | Mardilovich et al. | 429/30 |
| 2006/0093887 A1 * | 5/2006 | Nammensma et al. | 429/34 |

* cited by examiner

Primary Examiner—Patrick Ryan
Assistant Examiner—Cynthia Lee

(57) ABSTRACT

Subject matter describes a current collector for a fuel cell stack, wherein the current collector physically supports the fuel cell stack within a fuel cell and an electrode element of the fuel cell stack is attached as a deposited layer to the current collector. The current collector has openings to allow gases of the fuel cell to flow to and from the electrode element.

7 Claims, 10 Drawing Sheets

CURRENT COLLECTOR SUPPORTED FUEL CELL

TECHNICAL FIELD

This subject matter describes electrochemical power systems, and more particularly a current collector supported fuel cell.

BACKGROUND

Key elements of a fuel cell stack include an anode, a cathode, an electrolyte, and current collectors. In many fuel cell stack designs the electrolyte is sandwiched between the anode and cathode to form the basic cell stack, which may be repeated in series and/or parallel within a fuel cell. This cell stack sandwich is connected to two of the current collectors, which conduct electrical current to and from the electrodes. The current collectors aim to leave as much of the electrode surfaces exposed for gas exchange as possible.

Fuel cell types include among others, solid oxide fuel cells (SOFCs—to be described more fully immediately below), proton conducting ceramic fuel cells, alkaline fuel cells, polymer electrolyte membranes (PEM) fuel cells, molten carbonate fuel cells, solid acid fuel cells, and direct methanol PEM fuel cells.

SOFCs are among the most efficient of all fuel cell types, using ceramic materials for some of the active fuel cell components. A typical anode, for example, is made of electrically conducting nickel/yttria-stabilised zirconia cermet (Ni/YSZ), but the anode and cathode could be formed from any suitable material, such as nickel or lanthanum chromate, as desired and/or necessitated by a particular end use. Various exemplary anodes and/or cathodes can be metal(s), ceramic(s) and/or cermet(s). Some non-limitative examples of metals which may be suitable for the exemplary anode include at least one of nickel, platinum and mixtures thereof. Some non-limitative examples of ceramics which may be suitable for an anode include at least one of $Ce_xSm_yO_{2-\partial}$, $Ce_xGd_yO_{2-\partial}$, $La_xSr_yCr_zO_{3-\partial}$, and mixtures thereof. Some non-limitative examples of cermets which may be suitable for an anode include at least one of Ni-YSZ, Cu-YSZ, Ni-SDC, Ni-GDC, Cu-SDC, Cu-GDC, and mixtures thereof.

SOFCs are truly solid state since they require no liquid phase to transport charged anions from one electrode-electrolyte interface to the other. SOFCs can reduce production costs by simplifying design since corrosion is not a concern and the electrolyte has no parts or phases that need replacing: solid electrolytes can crack, but they cannot leak as there are no liquid species present. SOFCs are typically operated around 900-1000° C., however, cooler SOFCs are also available.

Some non-limitative examples of metals which may be suitable for a cathode include at least one of silver, platinum and mixtures thereof. A typical cathode may be made of a perovskite, lanthanum manganate ($LaMnO_3$). Some non-limitative examples of ceramics which may be suitable for a cathode include at least one of $Sm_xSr_yCoO_{3-\partial}$, $Ba_xLa_yCoO_{3-\partial}$, $Gd_xSr_yCoO_{3-\partial}$.

A typical solid oxygen conducting electrolyte is made of yttria-stabilised zirconia (YSZ), but the exemplary electrolyte may be formed from any suitable electrolytic material. Various exemplary electrolytes include oxygen anion conducting membrane electrolytes, proton conducting electrolytes, carbonate ($CO_3^{2-}$) conducting electrolytes, $OH^-$ conducting electrolytes, and mixtures thereof.

Other exemplary electrolytes include cubic fluorite structure electrolytes, doped cubic fluorite electrolytes, proton-exchange polymer electrolytes, proton-exchange ceramic electrolytes, and mixtures thereof. Other exemplary electrolytes can be samarium doped-ceria, gadolinium doped-ceria, LaaSrbGacMgdO3-$\partial$, and mixtures thereof, which may be particularly suited for use in SOFCs.

To generate a suitable voltage, fuel cells in the same stack are often interconnected with a doped lanthanum chromate (e.g., La0.8Ca0.2CrO3) joining the anodes and cathodes of adjacent units. Although there are several stack designs, a common design is the planar (or "flat-plate") SOFC.

The fuel flow for an exemplary fuel cell may contain a hydrocarbon fuel suitable for generating electricity in a dual chamber fuel cell, for example, methane ($CH_4$), hydrogen ($H_2$), or other hydrocarbon fuels suited to particular electrode compositions used in fuel cells, i.e., ethane, butane, propane, natural gas, methanol, and even gasoline. Methane and hydrogen are shown in the illustration as representative fuels.

At the anode the fuel adsorbs to the anode surface(s), which are usually porous, and diffuses toward the anode-electrolyte interface. At the cathode, oxidizer molecules, such as oxygen ($O_2$) from air, adsorb to the surface(s) of the cathode, which is also usually porous, and diffuse toward the cathode-electrolyte interface.

In a typical oxygen anion electrolyte, as the oxygen molecules diffuse toward the cathode-electrolyte interface, they become exposed to incoming electrons from the cell's external electrical circuit, and capture the electrons to become oxygen anions ($O^{-2}$). The oxygen anions migrate by toward the positively biased anode-electrolyte interface. When the oxygen anions and the fuel meet at the anode-electrolyte interface, the fuel combines with oxygen anions—an oxidation reaction—to form reaction products, such as water and carbon dioxide. Electrons are left over once the reaction products have formed. Two electrons are left over each time an oxygen anion combines with either a carbon atom or two hydrogen atoms of the fuel. The lost electrons are the source of the electric current that may be harnessed via the cell's external electrical circuit. Water and carbon dioxide diffuse toward the outer surface(s) of the anode and return to the stream of fuel flow.

In many types of conventional fuel cells, performance is decreased when manufacturers increase the thickness of an electrode or an electrolyte in order to use the electrode or the electrolyte as a mechanism for physically supporting the entire cell stack within a fuel cell chamber. A dense but thin electrolyte and porous but thin electrodes are desirable for efficient performance of many types of fuel cells, such as SOFCs. Thinner electrodes and electrolytes, however, would compromise structural integrity.

SUMMARY

Subject matter describes a current collector for a fuel cell stack, wherein the current collector physically supports the fuel cell stack within a fuel cell and an electrode element of the fuel cell stack is attached as a deposited layer to the current collector. The current collector has openings to allow gases of the fuel cell to flow to and from the electrode element.

DETAILED DESCRIPTION

Overview

Figure 1:
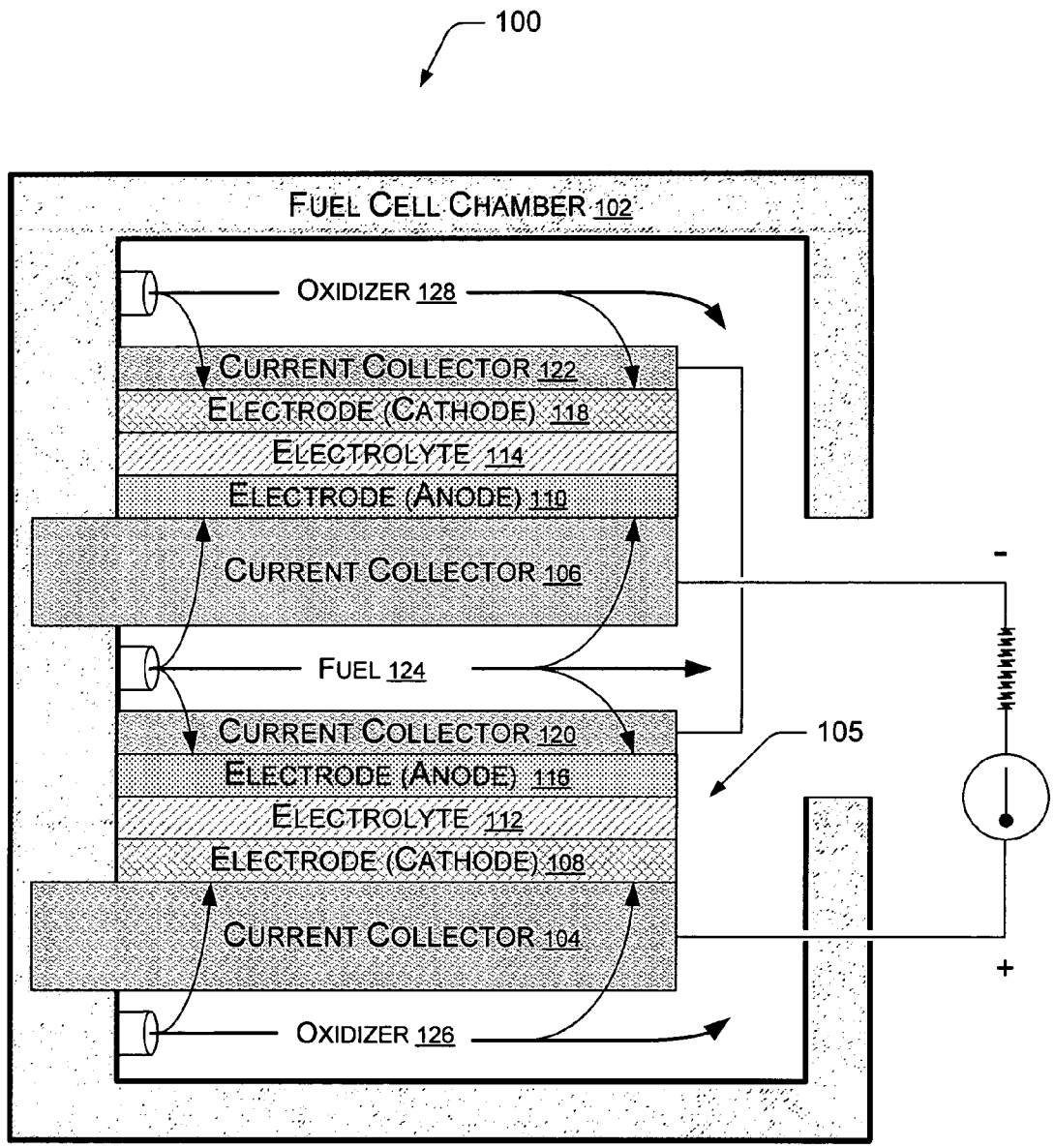
FIG. 1 is a graphic representation of a fuel cell including an exemplary current collector.

As shown in FIG. 1, the described subject matter includes a fuel cell 100 having a fuel cell chamber 102 and an exemplary current collector (e.g., 104) associated with a fuel cell stack 105 (i.e., 104, 108, 112, 116, and 120), wherein the exemplary current collector 104 physically supports the fuel cell stack 105 within the fuel cell 100. In FIG. 1, the exemplary current collector 104 is attached to a wall of the fuel cell chamber 102 and supports the fuel cell stack 105 in the fuel cell 100, whereas other elements of the fuel cell stack 105 may or may not be attached to a wall of the fuel cell chamber 102 and are not relied upon for physical support of the fuel cell stack 105.

The illustrated configuration of the fuel cell 100 is shown only as one example, in which two fuel cell stacks are electrically coupled in series to provide additive voltage. One exemplary supporting current collector 104 has been deposited in a sequence with a cathode (108) and subsequently with an electrolyte 112, an anode 116, and another current collector 120. Another exemplary supporting current collector 106 has been deposited in another sequence with an anode 110, an electrolyte 114, a cathode 118, and another current collector 122. There are many other fuel cell configurations devisable by persons having ordinary skill in the art of fuel cell design that are suitable for practicing the described subject matter. For example, in one implementation an exemplary current collector 104 may support a fuel cell stack 105 by being attached to a different fuel cell component than a wall of the fuel cell chamber 102, e.g., the exemplary current collector 104 may be attached only to an interconnect, etc.

In one implementation, during construction of the fuel cell stack 105, an electrode element (e.g., a cathode) 108 of the fuel cell stack 105 is deposited as a thin layer on the exemplary current collector 104. (Although a cathode is used as an example of an electrode 108, the deposited electrode 108 could also be an anode.) The exemplary current collector 104 is pre-formed and/or is etched after electrode deposition so that gases (124, 126, 128) of the fuel cell 100 can flow to and from the deposited electrode 108 through the exemplary current collector 104. If an exemplary current collector 104 is etched, the etching may be accomplished by any one of chemical etching, dry-etching, mechanical etching, optical etching, laser etching, and electron beam etching, etc.

Exemplary methods are presented for making and using an exemplary current collector 104 that is capable of providing: electrical conduction; structural integrity/physical support for the elements of a fuel cell stack 105, including support for the elements to be made very thin; and free flow of gases to the electrodes of a fuel cell 100. Thus an exemplary current collector 104 provides an opportunity for an increase in fuel cell efficiency by enabling the elements of the fuel cell stack 105 to be made very thin.

With the rise of solid electrolytes, conventional fuel cell makers have sometimes supported fuel cell stacks using an electrode or a solid electrolyte element of the fuel cell stack. This has usually required building up, i.e., thickening, the supporting electrode or electrolyte so that it is strong enough to physically support the rest of the stack. Increasing the thickness of an electrode or the electrolyte, however, generally increases the length and tortuosity of the pathway that gases and ions have to travel and presents resistance to the ions, reducing cell efficiency.

The thickness and/or mechanical strength of the current collector does not usually affect the electrochemical efficiency of the fuel cell 100 and so an exemplary current collector 104 can be made relatively thick while electrodes (108, 116) and the electrolyte 112 are made relatively thin. This transfer of the physical support role from elements active in the electrochemical operation of the cell to one or more of the current collectors 104 is beneficial to all the elements of the fuel cell stack 105. Not only can the electrodes 108, 116 and the electrolyte 112 be made thinner without compromising structural integrity of the stack assembly, but the increased thickness of an exemplary current collector 104 allows it to carry a heavier electrical current with less resistance. A solid oxide electrolyte 112, for example, can be reduced to a thickness of five microns or even less, although an electrolyte thickness of less than one micron may result in electrical shorting between electrodes.

Simply connecting a physically strong current collector to an electrode 108 to support the fuel cell stack 105 does not necessarily yield an improved or even viable cell stack 105. An exemplary current collector 104 described herein yields an improved cell stack 105 by fulfilling its threefold role— collecting current, physically supporting the cell stack 105, and allowing free flow of gases through itself—while also providing flatness as a base of support for very thin electrodes 108 and electrolytes 112.

Exemplary Methods

Exemplary methods include making and using the exemplary current collector 104 so that it can support a fuel cell stack 105 without blocking fuel 124 and oxidizer gases 126, 128; making thinly layered electrodes 108, 116 and electrolytes 112; and making a fuel cell stack 105 that uses the supporting exemplary current collector 104. In these exemplary methods, various electrodes, electrolytes, current collectors, and interconnects are often deposited as layers or films on top of each other. "Depositing" as used herein means establishing at least physical and usually electrical contact between two materials: a second material that is painted, sprayed, plated, electroformed, electrodeposited, sputtered (vacuum deposited), dip coated, spin coated, sublimed, evaporated, etc. onto a surface of a first material. In addition, the first material and the second material are often sintered, annealed, or subjected to pressure, etc., after deposition to improve the solid-state bonding between the surfaces of the two materials, and hence the strength of their physical and electrical coupling.

Method of Making a Current Collector

Figure 2:
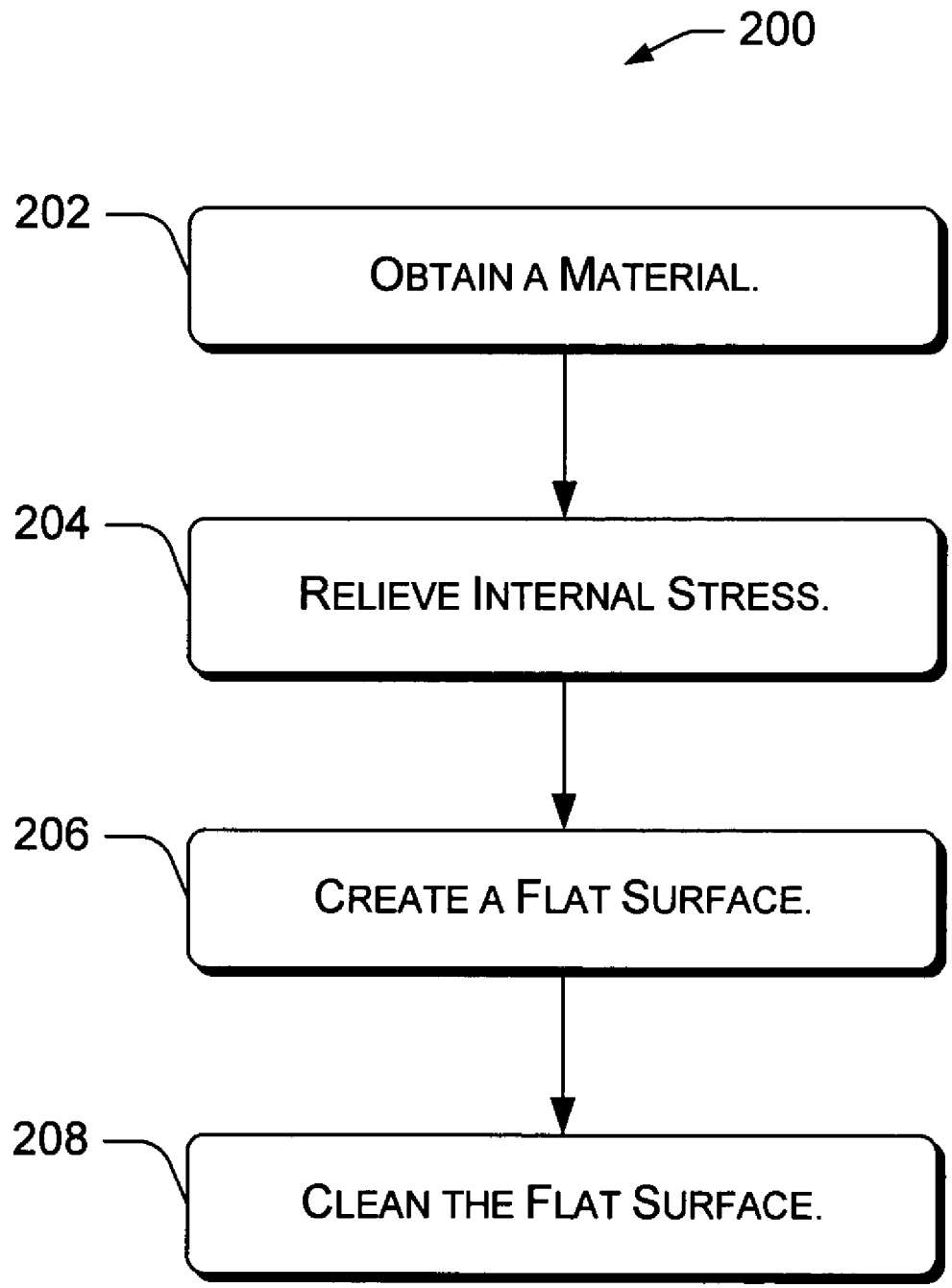
FIG. 2 is a flow diagram of an exemplary method of making an exemplary current collector.

FIG. 2 shows a flowchart of an exemplary method 200 of making an exemplary current collector 104 upon which other fuel cell elements can be deposited. In the flow diagram, the operations are summarized in individual blocks.

At block 202, the exemplary method 200 begins with obtaining a material or composition ("material") suitable for use as the current collector. The material ideally has a tensile strength, rigidity, hardness, etc. that when shaped or formed into the desired geometry of the finished exemplary current collector 104 is able to support other fuel cell stack elements in the same stack 105 as the exemplary current collector 104. In many implementations, the material is ideally selected so that at a thickness sufficient to physically support the stack assembly, the exemplary current collector 104 is able to withstand the high temperatures and thermal expansion and contraction inside a high temperature fuel cell 100, such as a high temperature SOFC. Some exemplary suitable materials for the exemplary current collector 104 are stainless steel, tungsten, titanium, nickel, etc., some metal alloys, and some conducting ceramics. Aluminum may be added to metals and alloys in some circumstances to retard vigorous oxidation characteristic inside some parts of fuel cells. In considering which material to use, a nominal thickness for an exemplary finished current collector is around two hundred microns. Relatively strong starting materials, such as titanium, etc. may be thinner. The thickness to be selected for the exemplary finished current collector 104 is not critical to the electrochemical operation of the cell as long as the material provides adequate structural support, thus a wide range of thicknesses is possible, from ten microns or less up to one thousand microns (one millimeter) or even more. In one implementation, an exemplary current collector layer has a thickness approximately between ten and twenty times a thickness of one of the electrodes or the electrolyte.

The selection of a material may take into consideration not only the minimum thickness needed for structural integrity and physical support of the cell stack but also the amount of electrical current the exemplary finished current collector 104 should be able to carry. As the exemplary current collector 104 goes through thermal cycles when the fuel cell 100 starts and stops, the exemplary current collector 104 ideally withstands the thermal stress. If the exemplary current collector 104 is a conducting ceramic, for example, the brittleness of the ceramic can make it vulnerable to breakage.

At block 204, depending on the material obtained, a stress relief step may be used to relieve internal tension of the exemplary material. The stress relief step can prevent the material selected from fissuring, cracking, fracturing etc. during the thermal expansion and contraction of normal cell operation. For some materials, the stress relief step can be provided by heating the material to mobilize molecules or ions followed by slow cooling to allow molecules to settle into stable positions (i.e., to release the potential energy of unstable molecular configurations). When the stress relief step has allowed the molecules of the material to find stable configurations the material is better suited to hold a flat surface (explained below) and to tolerate the temperature swings inherent inside many fuel cells.

At block 206, the material is deposited, cut, polished, etc. to render at least one surface of the material substantially flat. This flatness allows uniform deposition of subsequent layers and facilitates cleaning. Of course, a material may be selected that is flat to begin with. There are many foils available, e.g., copper and nickel foils, that provide sufficient flatness.

At block 208, at least one flat surface of the current collector material can be cleaned to minimize contact resistance. "Clean" means that chemical species foreign to the current collector material, including oxides of the material, are reduced as much as practicable. An unclean surface can result in inferior bonding between the exemplary current collector 104 and an electrode 108 to be deposited on or connected to the exemplary current collector 104. An unclean surface can also result in electrical resistance between the exemplary current collector 104 and an exemplary electrode 108 if an oxide layer or patina remains after forming a flat surface. A surface oxide layer may be removed through chemical activation.

Figure 3:
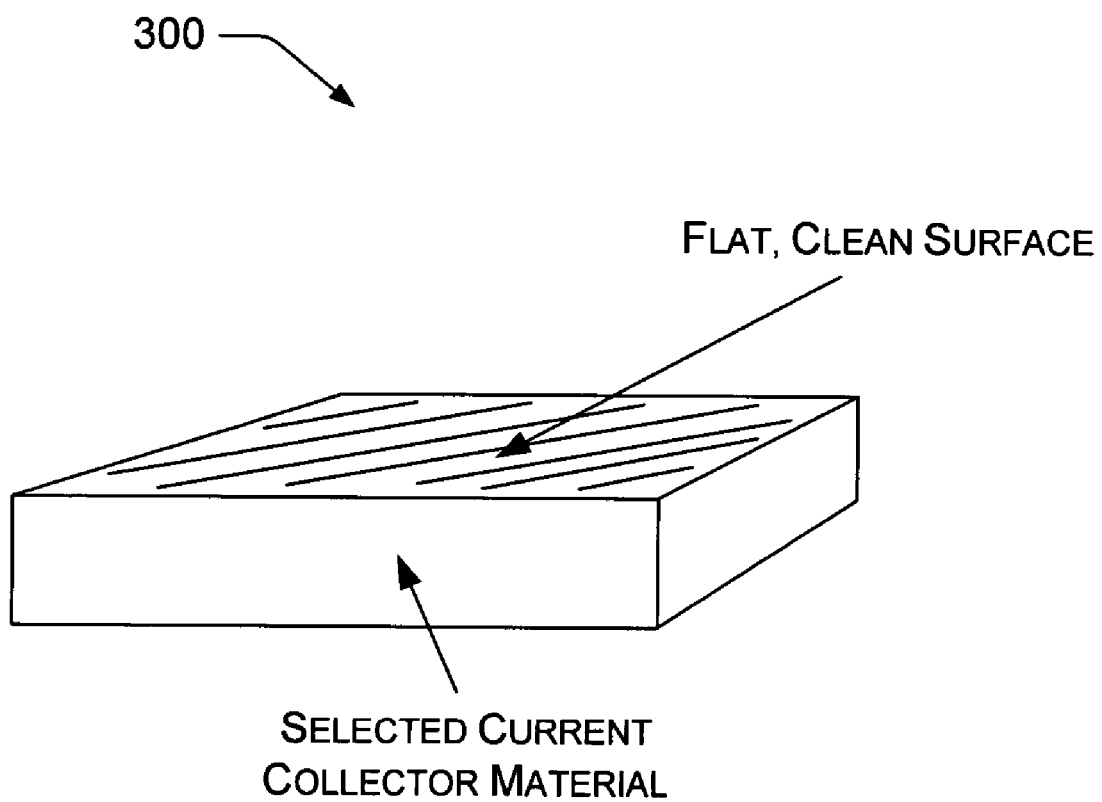
FIG. 3 is a graphic representation of the exemplary current collector made by the method of FIG. 2.

FIG. 3 shows a diagrammatic representation of the exemplary current collector 300 prepared by the exemplary method 200 of FIG. 2.

Method of Making a Fuel Cell Stack

Exemplary methods for making a fuel cell stack 105 are now presented. Some parts of the exemplary methods are particularly suited for making a fuel cell stack 105 for a SOFC. The exemplary methods for making a fuel cell stack 105 and for making thin electrode 108, 116 and electrolyte 112 layers can overlap, since making a thin layer can occur several times during making a fuel cell stack 105.

Figure 4:
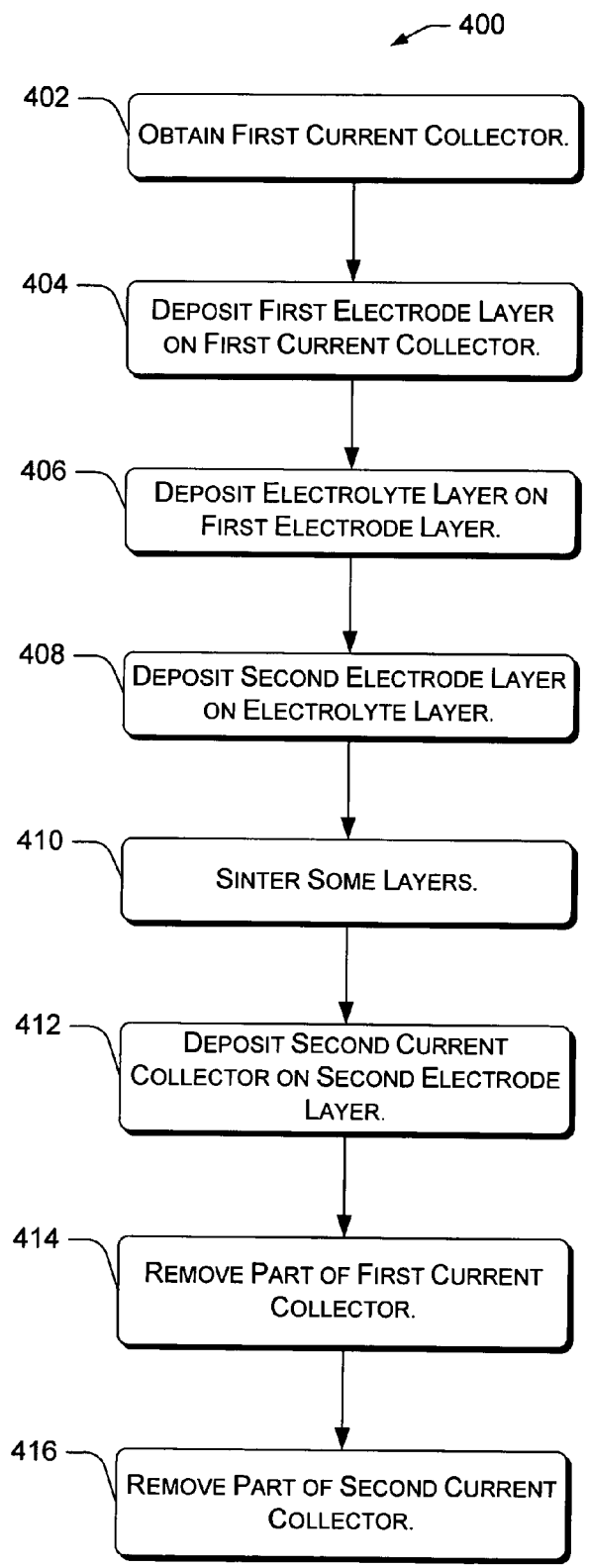
FIG. 4 is a flow diagram of an exemplary method of making a fuel cell stack.
Figure 5A:
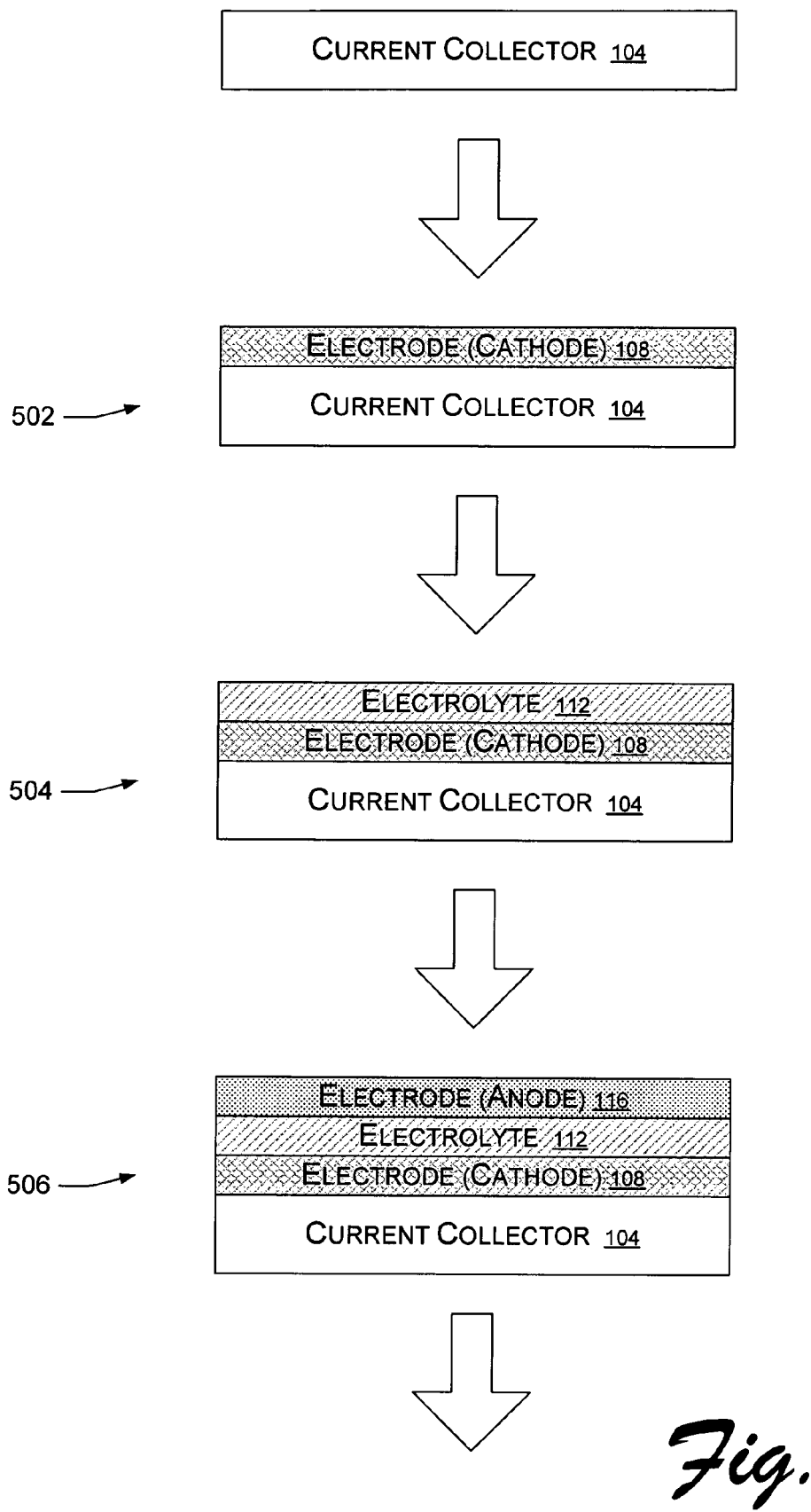
FIGS. 5a and 5b are a graphic representation of the exemplary method of FIG. 4.
Figure 5B:
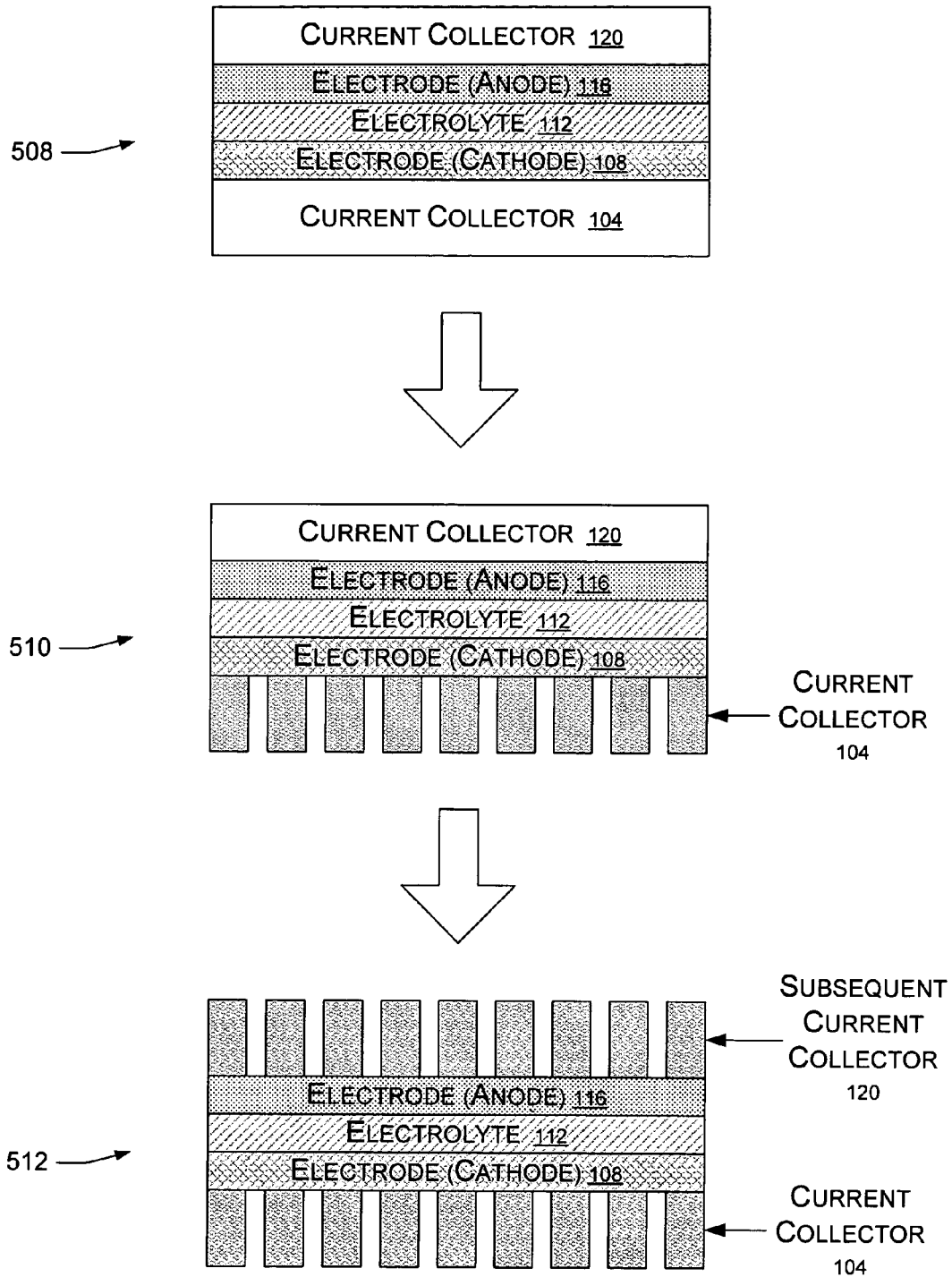

FIGS. 4, 5a, and 5b show a flow diagram and graphic representations, respectively, of one exemplary method 400 of making a fuel cell stack 105. In the flow diagram, the operations are summarized in individual blocks.

At block 402, the exemplary method 400 begins with obtaining an exemplary first current collector 104, for example, by the exemplary method 200 described above. The first current collector 104 forms a base for adding other layers to build the fuel cell stack 105.

At block 404, after the exemplary first current collector 104 having a flat, clean surface has been obtained, a first electrode layer 108 is deposited 502 on the flat surface of the exemplary first current collector 104. Depending on the material used for the first electrode layer 108 and the material of the first current collector 104, sintering may be desirable to increase the fusion or bond between their surfaces.

At block 406, an electrolyte layer 112 is deposited 504 on the first electrode layer 108. The method of deposition depends on the material used for the electrolyte layer 112. Depending on the material used for the first electrode layer 108 and the material used for the electrolyte layer 112, sintering may be desirable to increase the fusion or bond between their surfaces.

At block 408, a second electrode layer 116 or "counter electrode" is deposited 506 on the electrolyte layer 112. The deposition technique depends on the material used for the second electrode layer 116. Depending on the material used for the electrolyte layer 112 and the material used for the second electrode layer 116, sintering may again be desirable to increase the fusion or bond between their surfaces.

At block 410, in some implementations, the partial stack assembly 105 made to this point is at a stage wherein sintering may be performed instead of or in addition to preceding sintering steps performed for individual layers.

At block 412, a second current collector layer 120 is deposited 508 on the second electrode layer 116. The deposition technique depends on the material used for the second current collector layer 120. The material for the second current collector layer 120 can be the same as the material for the first current collector 104, but can also be different, for example, if the first current collector 104 physically supports the fully layered stack assembly 105 but the second current collector layer 120 does not. Depending on the material used for the second current collector layer 120 and the second electrode layer 116, sintering may be desirable to increase the fusion or bond between their surfaces.

At block 414, in some types of fuel cells such as SOFCs, it is desirable for the first current collector 104 and the second current collector layer 120 to leave as much of the first electrode layer 108 and the second electrode layer 116 unoccluded as possible without compromising support in order to maximize exposure of electrode surfaces to fuel and/or oxidizer gases. Thus, parts of the first current collector 104 are removed or are etched away 510 from at least some of the surface area of the first electrode layer 108 to expose more of the first electrode layer 108. An etch pattern or schema may be used that allows the first current collector 104 to remain in integral electrical contact with all non-etched parts of itself and with the first electrode layer 108. In other words, an etch pattern provides holes so that fuel and/or oxidizer (usually air) can "pass through" the first current collector 104 and the second current collector layer 120 to reach the electrode layers 108, 116. The etch pattern or schema that is used ideally allows the first current collector 104 to maintain its ability to provide physical structural support for the entire stack assembly 105. Thus, in some implementations, an excess of starting material for the first current collector 104 may be used so that after etching, the first current collector 104 maintains desirable physical dimensions. Etching may be accomplished through chemical, dry-etch, mechanical, optical (e.g. laser, photo-lithography), electron-beam, and other techniques. Alternatively, the first current collector 104 may have a pattern of holes or channels from its creation, for example, by fabricating the first current collector 104 in a form or die ("form") that imparts the holes or channels to the first current collector 104. The form can be, for example, a patterned layer of photo-resist material on a mandrel (substrate), as will be discussed below with reference to FIGS. 8 and 9.

At block 416, it is also desirable for the subsequent current collector layer 120 to leave as much of the second electrode layer 116 unoccluded as possible without compromising support in order to maximize exposure of the second electrode surface to fuel and/or oxidizer gases. Accordingly, some of the second current collector layer 120 is removed or etched away 512 from at least some of the surface area of the second electrode layer 116 to better expose the second electrode layer 116 to a fuel and/or oxidizer during operation of the working fuel cell. An etch pattern or schema may be used that allows the second current collector 120 to remain in integral electrical contact with all non-etched parts of itself and with the second electrode layer 116. Since the second current collector layer 120 may be made of a different material or have different physical dimensions than the first current collector 104, the etching process may vary from that used on the first current collector 104. In some implementations, however, the second current collector layer 120 may also participate in physical support of the stack assembly 105 and so the etching process may be the same.

Figure 6:
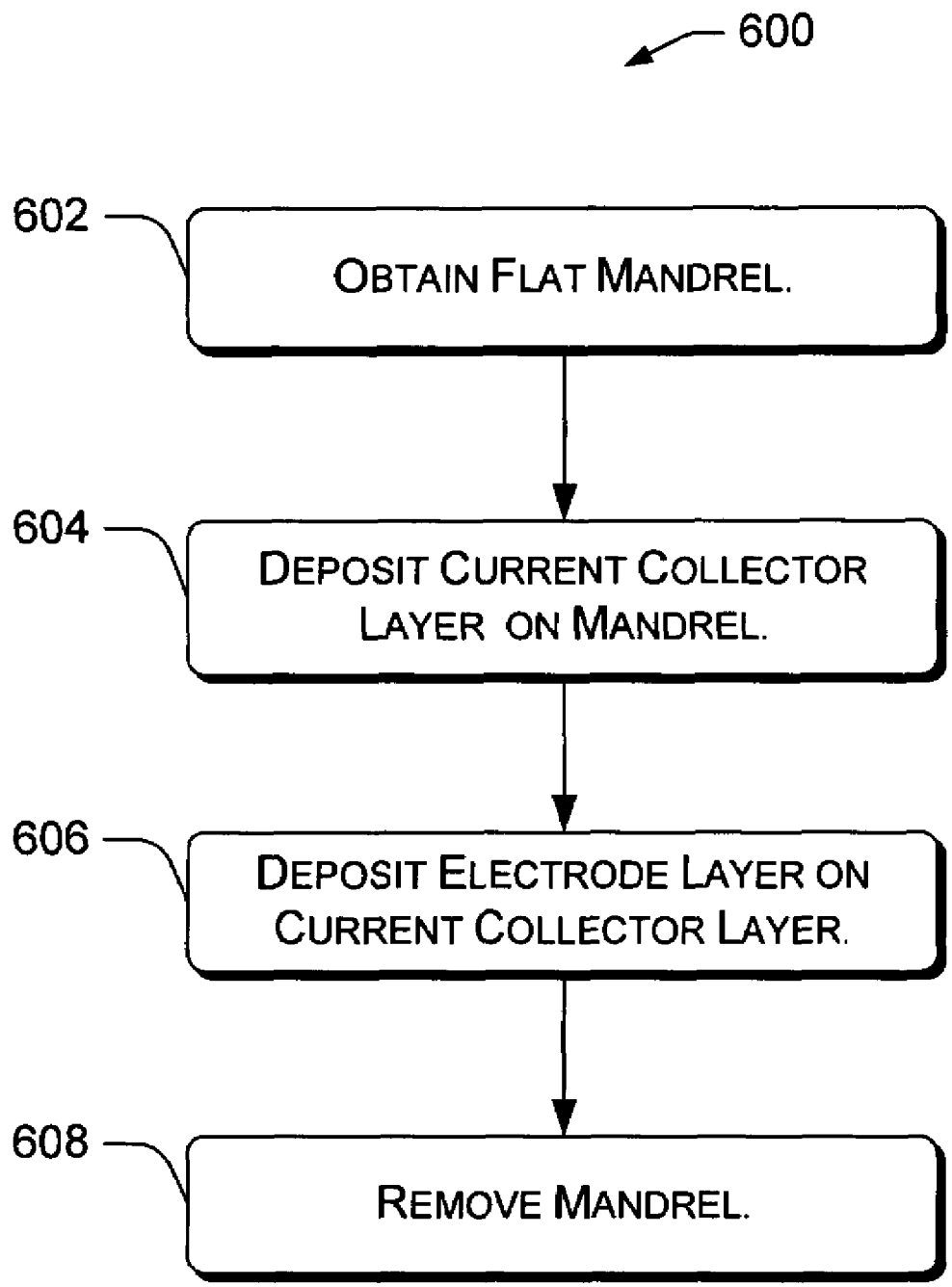
FIG. 6 is an exemplary method of making a current collector on a mandrel.
Figure 7:
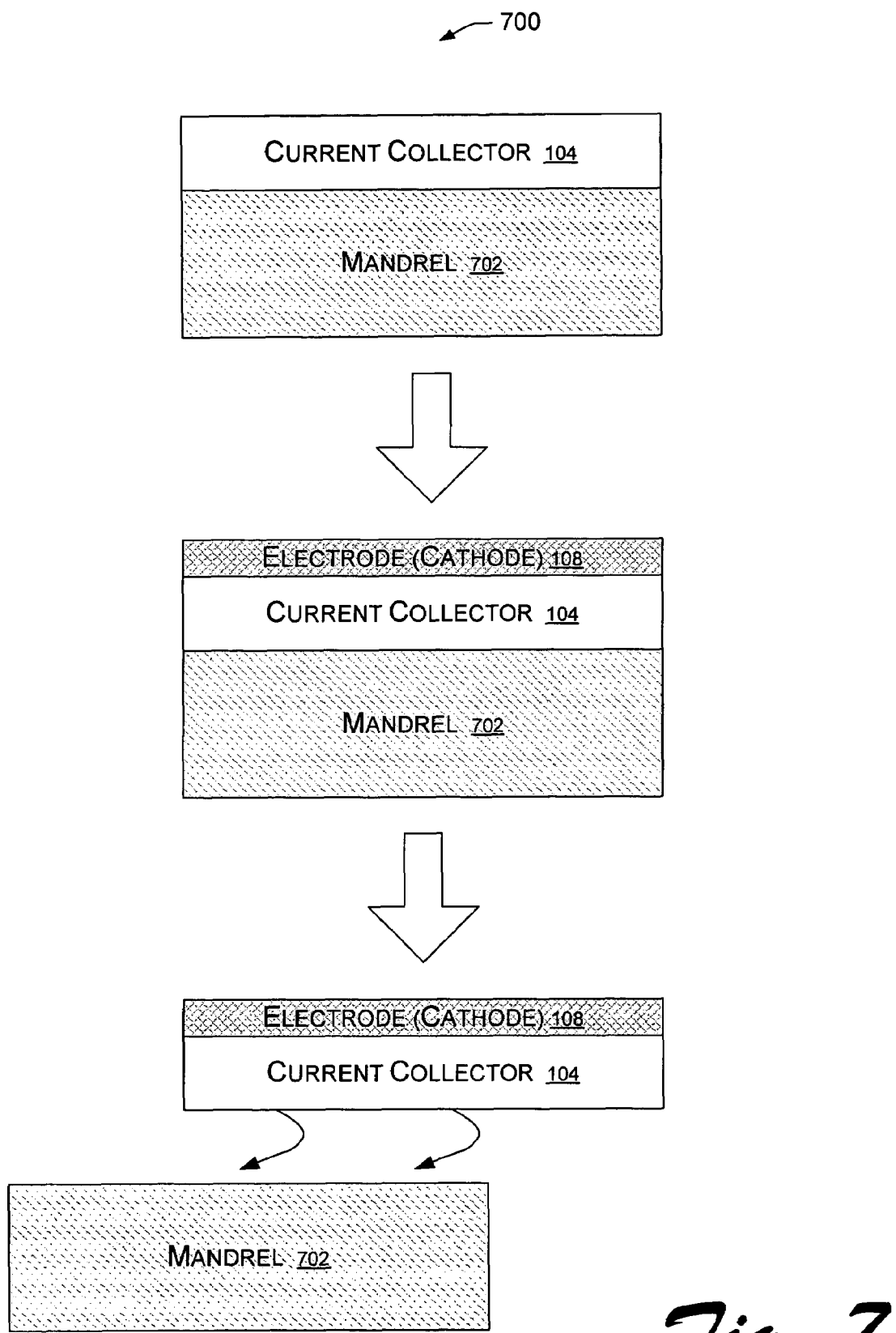
FIG. 7 is a graphic representation of the exemplary method of FIG. 6.

FIGS. 6 and 7 show a flow diagram of an exemplary method 600 and a corresponding graphic representation 700 for making a first current collector layer 104 via deposition. In the flow diagram, the operations are summarized in individual blocks.

In one implementation, a mandrel 702 is used to provide a flat starting surface on which to deposit the first current collector layer 104 by deposition, electrodeposition, and/or electroforming, etc. The mandrel 702 is a substrate upon which the deposition can take place. In one implementation, the mandrel 702 is reusable, such as a glass piece upon which a preliminary conductive layer is first deposited followed by deposition or formation of a temporary release layer. After the first current collector layer 104 is formed on this mandrel 702, the mandrel 702 is released and then re-used to make another first current collector layer 104.

Electrodeposition as a deposition technique for making the first current collector layer 104, e.g., on the mandrel 702, provides the advantages of a fresh metal surface for better cleanliness, reduction in contact resistance, control of the thickness of the layer deposited, and potentially better adhesion of the next layer than some of the other methods of deposition. A material for the mandrel 702, such as glass, may be selected to provide a very flat surface for the electroforming. A correspondingly flat first current collector layer 104 is obtained. Electrodeposition of the first current collector layer 104 allows the use of such metals as nickel, copper, gold, rhodium, palladium, platinum, zinc, chromium etc. and allows use of alloys such as stainless steel. In the flow diagram for the exemplary method 600, the operations are summarized in individual blocks.

At block 602, a mandrel 702 is obtained having a flat surface upon which the deposition can take place. For electrodeposition, the mandrel surface is electrically conductive and thus the material for the mandrel can be a metallic or semi-metallic electrical conductor or can be an electrical non-conductor such as glass having the preliminary conductive layer deposited before the first current collector layer 104 is deposited, as mentioned above. The conductive surface of the mandrel 702, whether inherently conductive or made so by deposit of a preliminary conductive layer, is usually surmounted by a "release layer" such as surface oxide layer so that the first current collector layer 104 that is deposited thereon can be easily removed from the surface of the mandrel 702.

At block 604, the first current collector layer 104 is deposited on the mandrel 702. The thickness of the first current collector layer 104 is controlled if electrodeposition is used, and of course selection of the thickness of the layer depends on the ability of the particular metal or alloy being electrodeposited to physically support the completed stack assembly 105.

At block 606, the first electrode layer 108 is typically deposited on the first current collector layer 104. This assures that the boundary between the first current collector layer 104 and the first electrode layer 108 is made while the first current collector layer 104 is still flatly supported by the mandrel 702.

At block 608, the mandrel 702 may be removed, especially if the material selected for the mandrel 702 cannot withstand a high temperature sintering of subsequent layers. If the mandrel 702 is removed, then the exemplary method 600 proceeds with the deposition of the electrolyte layer 112, the second electrode layer 116, the second current collector layer 120, and the etching operations in a manner similar to the exemplary method 400 above.

Alternatively, the exemplary method 600 can proceed with the mandrel 702 still in place, if it can withstand sintering or if no sintering is required.

An electrical interconnect may be used to attach an anode 116 or cathode 108 of one stack assembly 105 to the opposing electrode on another stack assembly to connect the stacks in series. The material for such an interconnect is typically a ceramic-oxide, such as lanthanum chromate ($LaCrO_3$), which does not have the oxidation vulnerability of most metals.

When an exemplary fuel cell stack 105 has been made, the exemplary supporting current collector 104 can be attached directly or indirectly to a surface of a fuel cell chamber 102 that houses one or more of the fuel cell stack assemblies. A fuel cell chamber 102 is usually a container that provides a basis of physical support for fuel cell stack assemblies but may also help to compartmentalize and direct fuel and oxidizer gases to appropriate electrodes on a given stack assembly.

Figure 8:
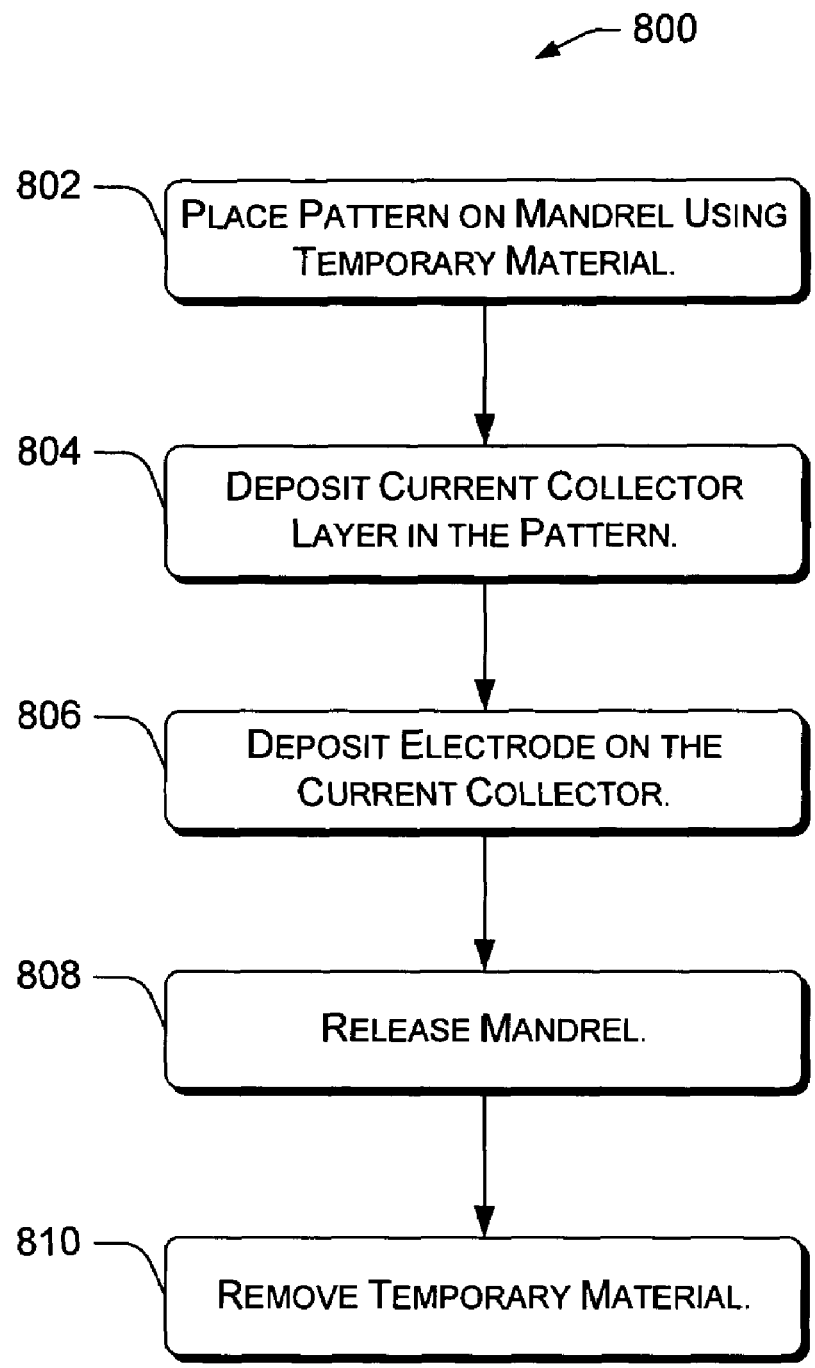
FIG. 8 is an exemplary method of making a fuel cell stack using a mandrel.
Figure 9:
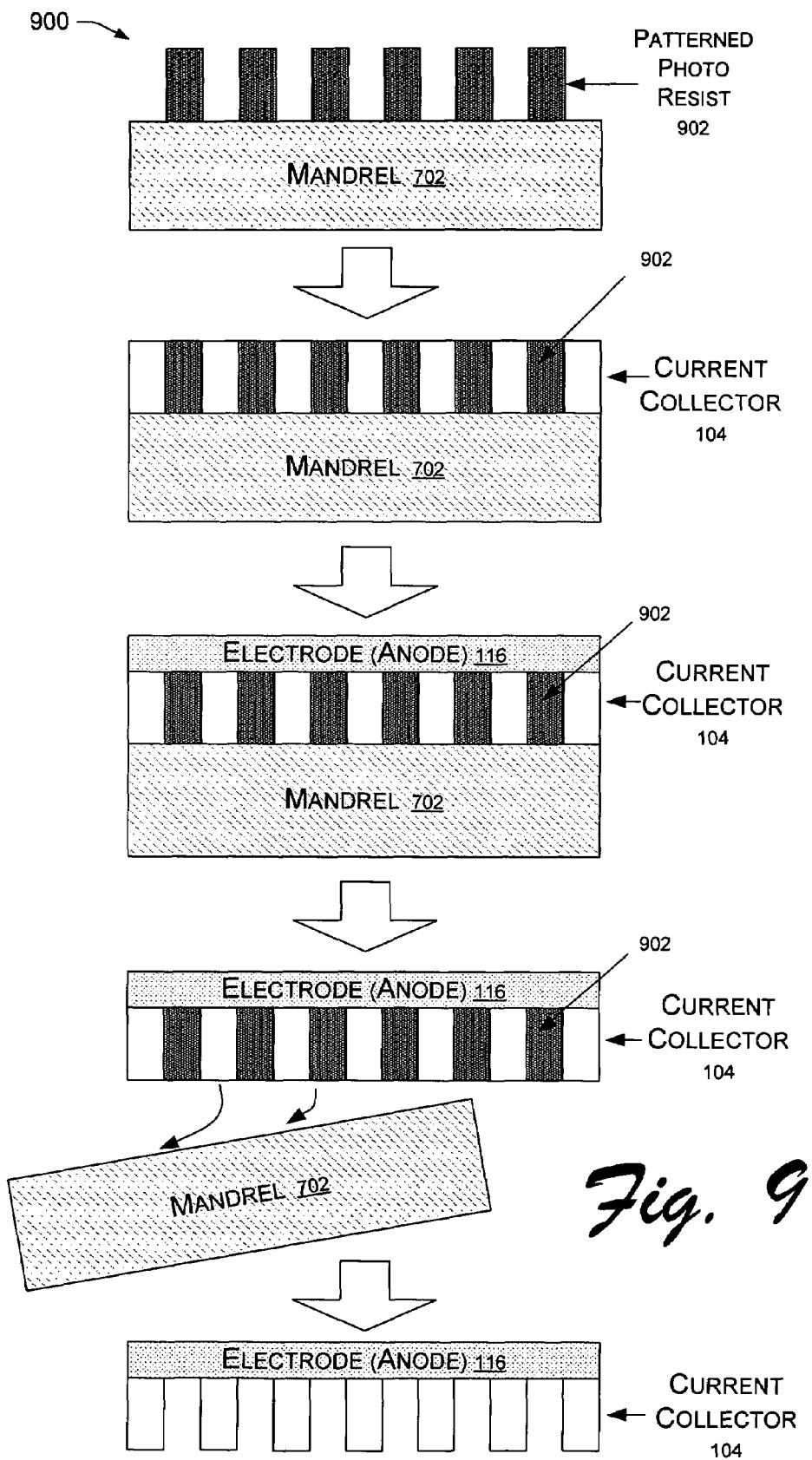
FIG. 9 is a graphic representation of the exemplary method of FIG. 8.

FIGS. 8 and 9 show a flow diagram of an exemplary method 800 and a corresponding graphic representation 900 for making an exemplary current collector 104. In the flow diagram, the operations are summarized in individual blocks.

Instead of etching the first current collector 104 after some or all of the cell stack has been assembled, this exemplary method 800 aims to create a first current collector 104 that already has (from its creation) a pattern of channels or holes for letting gases pass through. This may be accomplished by using a patterned mandrel 702, which in one implementation can be accomplished through standard lithography means.

At block 802, photo-resist 902 or another removable or dissolvable temporary material is placed on the mandrel 702 in a pattern.

At block 804, the material for the first current collector 104 is deposited on and/or in-between the channels or pattern formed by the photo-resist 902. If the deposition process used to deposit the material of the first current collector 104 leaves an excess of material above the level of the tops of the photo-resist channels or pattern, the excess may be removed and the top surface may be smoothed, sanded, polished, etc. so that the material of the first current collector 104 and the photo-resist 902 together form a flat surface.

At block 806, a first electrode 108 is deposited on the flat surface produced above in block 804.

At block 808, the mandrel 702 is released from the stack assembly, leaving the first electrode 108 attached to the patterned first current collector 104 and the photo-resist 902 or other temporary material. Alternatively, the mandrel 702 is left attached, for example, if the mandrel is made of material that can handle sintering operations, if any, to be performed when other layers are added.

At block 810, the photo-resist or other temporary material is developed, dissolved, burned off in a sintering step, biodegraded, etc. so that its removal leaves only the patterned first current collector 104, which still adheres to the first electrode layer 108.

If sintering is needed and has not already been performed, the patterned first current collector 104 and the first electrode layer 108 can be sintered at this stage. Assembly of the remainder of a cell stack can also proceed without sintering, for example, as in exemplary methods 400 and 600. The operation of etching the first current collector 104, however, is skipped because the exemplary patterned first current collector 104 already has pre-existing channels or holes by virtue of the pattern.

CONCLUSION

The foregoing describes a current collector supported fuel cell. In one implementation, an exemplary current collector can provide structural integrity and physical support for the elements of a fuel cell stack while providing an increase in fuel cell efficiency by enabling the electrochemical elements of the fuel cell stack to be very thin. Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claimed subject matter.

The invention claimed is:

1. A method, comprising:
    obtaining a first current collector layer suitable for physically supporting parts of a fuel cell stack, wherein the fuel cell stack includes at least two electrodes and an electrolyte layer;
    depositing a first electrode on the first current collector layer;
    depositing the electrolyte layer of the fuel cell stack on the first electrode layer;
    depositing a second electrode layer of the fuel cell stack on the electrolyte layer;
    depositing a second current collector layer of the fuel cell stack on the second electrode layer; and
    mounting the fuel cell stack within an enclosure defining a chamber of a fuel cell, wherein a connection between an inside surface of the enclosure and the first current collector layer physically supports the fuel cell stack within the chamber, and wherein the first current collector layer is cantilevered within the chamber of the fuel cell to support the fuel cell stack.

2. The method as recited in claim 1, wherein the the second current collector is not cantilevered within the chamber of the fuel cell to support the fuel cell stack.

3. The method as recited in claim 1, wherein the first and second current collector layers are made of different materials, differently etched and only the first current collector layer is used to support the fuel cell stack in a fuel cell.

4. The method as recited in claim 1, wherein the first current collector layer has a thickness of approximately between ten and twenty times a thickness of one of the electrodes or the electrolyte.

5. The method as recited in claim 1, wherein the first current collector layer has a thickness of approximately between ten and one thousand microns.

6. The method as recited in claim 1, wherein the first and second electrode layers or the electrolyte layer have a thickness of approximately five microns.

7. The method as recited in claim 1, wherein the first and second electrode layers or the electrolyte layer has a thickness less than five microns.

\* \* \* \* \*

UNITED STATES PATENT AND TRADEMARK OFFICE
CERTIFICATE OF CORRECTION

PATENT NO. : 7,527,888 B2 Page 1 of 1
APPLICATION NO. : 10/648096
DATED : May 5, 2009
INVENTOR(S) : Niranjan Thirukkovalur It is certified that error appears in the above-identified patent and that said Letters Patent is hereby corrected as shown below:

On the face page, in field (75), in "Inventors", in column 1, line 1, delete "Niranjan Thirukk valur" and insert -- Niranjan Thirukkovalur --, therefor.

In column 10, line 29, in Claim 2, after "wherein" delete "the".

In column 10, line 37, in Claim 4, after "thickness" delete "of".

Signed and Sealed this

Twenty-second Day of September, 2009

David J. Kappos
*Director of the United States Patent and Trademark Office*